United States Patent
Huang

(10) Patent No.: US 12,039,918 B2
(45) Date of Patent: Jul. 16, 2024

(54) DISPLAY SYSTEM AND A VOLTAGE CONTROLLER THEREOF

(71) Applicant: Himax Technologies Limited, Tainan (TW)

(72) Inventor: Han-Wen Huang, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 18/128,898

(22) Filed: Mar. 30, 2023

(65) Prior Publication Data

US 2024/0062703 A1 Feb. 22, 2024

(30) Foreign Application Priority Data

Aug. 22, 2022 (TW) .................................. 111131528

(51) Int. Cl.
*G09G 3/32* (2016.01)
*G09G 3/20* (2006.01)
*H02M 3/07* (2006.01)

(52) U.S. Cl.
CPC ............. *G09G 3/32* (2013.01); *G09G 3/2096* (2013.01); *H02M 3/07* (2013.01); *G09G 2330/021* (2013.01); *G09G 2330/028* (2013.01); *G09G 2380/04* (2013.01)

(58) Field of Classification Search
CPC .. G09G 3/32; G09G 3/2096; G09G 2330/021; G09G 2330/028; G09G 2380/04; H02M 3/07
See application file for complete search history.

(56) References Cited

U.S. PATENT DOCUMENTS

| | | | |
|---|---|---|---|
| 2009/0096288 A1* | 4/2009 | Nguyen | H02J 1/08 307/31 |
| 2010/0033415 A1* | 2/2010 | Bae | G09G 3/3696 345/94 |
| 2019/0356215 A1* | 11/2019 | Lin | G05F 1/468 |
| 2021/0201975 A1* | 7/2021 | Chang | G11C 11/1659 |
| 2021/0242771 A1* | 8/2021 | Chen | H02J 7/0068 |

FOREIGN PATENT DOCUMENTS

| | | | | |
|---|---|---|---|---|
| CN | 102043274 A | * | 5/2011 | ........... G09G 3/3648 |
| CN | 208889306 U | * | 5/2019 | ............ G02B 30/27 |
| KR | 20120137113 A | * | 12/2012 | |

OTHER PUBLICATIONS

English translation of KR20120137113 A (Year: 2012).*
English translation of CN102043274 A (Year: 2011).*
English translation of CN208889306 U (Year: 2019).*

* cited by examiner

*Primary Examiner* — Lixi C Simpson
(74) *Attorney, Agent, or Firm* — Donald E. Stout; Stout, Uxa & Buyan, LLP

(57) ABSTRACT

A voltage controller of a display system includes a gate high voltage detector for detecting a gate high voltage, and a gate low voltage detector for detecting a gate low voltage. The gate high voltage and the gate low voltage are supplied to a gate driver, and the gate high voltage is greater than the gate low voltage.

20 Claims, 3 Drawing Sheets

DISPLAY SYSTEM AND A VOLTAGE CONTROLLER THEREOF

CROSS-REFERENCE TO RELATED APPLICATIONS

This application claims priority under 35 U.S.C. 119 to Taiwan Patent Application No. 111131528, filed on Aug. 22, 2022, the entire content of which are herein expressly incorporated by reference.

BACKGROUND OF THE INVENTION

1. Field of the Invention

The present invention generally relates to a display system, and more particularly to a display system adaptable to electronic shelf label (ESL).

2. Description of Related Art

Electronic shelf label (ESL) may be used by retailers for displaying product pricing on shelves. The product pricing is automatically updated whenever a price is changed under the control of a central server. ESL uses electronic paper (E-paper) to show the current product price, which may be retained without consuming power until a product price is changed, thereby substantially decreasing power consumption.

A boost converter is a DC-to-DC power converter used to enhance an input voltage. The boost converter is widely used in ESL to provide required voltages for a driver. For large format displays, two boost converters are usually used to make sure that power voltages can be maintained at nominal voltage values without being affected by loading, however at higher cost and large circuit area.

Accordingly, a need has thus arisen to propose a novel scheme to overcome drawbacks of the conventional ESL.

SUMMARY OF THE INVENTION

In view of the foregoing, it is an object of the embodiment of the present invention to provide a display system adaptable to electronic shelf label (ESL) capable of effectively maintaining power voltages at nominal voltage values.

According to one embodiment of the present invention, a display system includes a display panel, a gate driver, a source driver, a power converter and a voltage controller. The display panel is composed of a plurality of pixels arranged in a matrix form. The gate driver activates a pixel row of the display panel, and the source driver provides image data to pixel columns of the display panel. The power converter generates power voltages to the gate driver. The voltage controller detects the power voltages generated by the power converter and accordingly generates a control signal for controlling the power converter.

In one embodiment, the voltage controller includes a gate high voltage detector and a gate low voltage detector. The gate high voltage detector detects a gate high voltage, and the gate low voltage detector detects a gate low voltage. The gate high voltage and the gate low voltage are supplied to the gate driver, and the gate high voltage is greater than the gate low voltage.

DETAILED DESCRIPTION OF THE INVENTION

Figure 1:
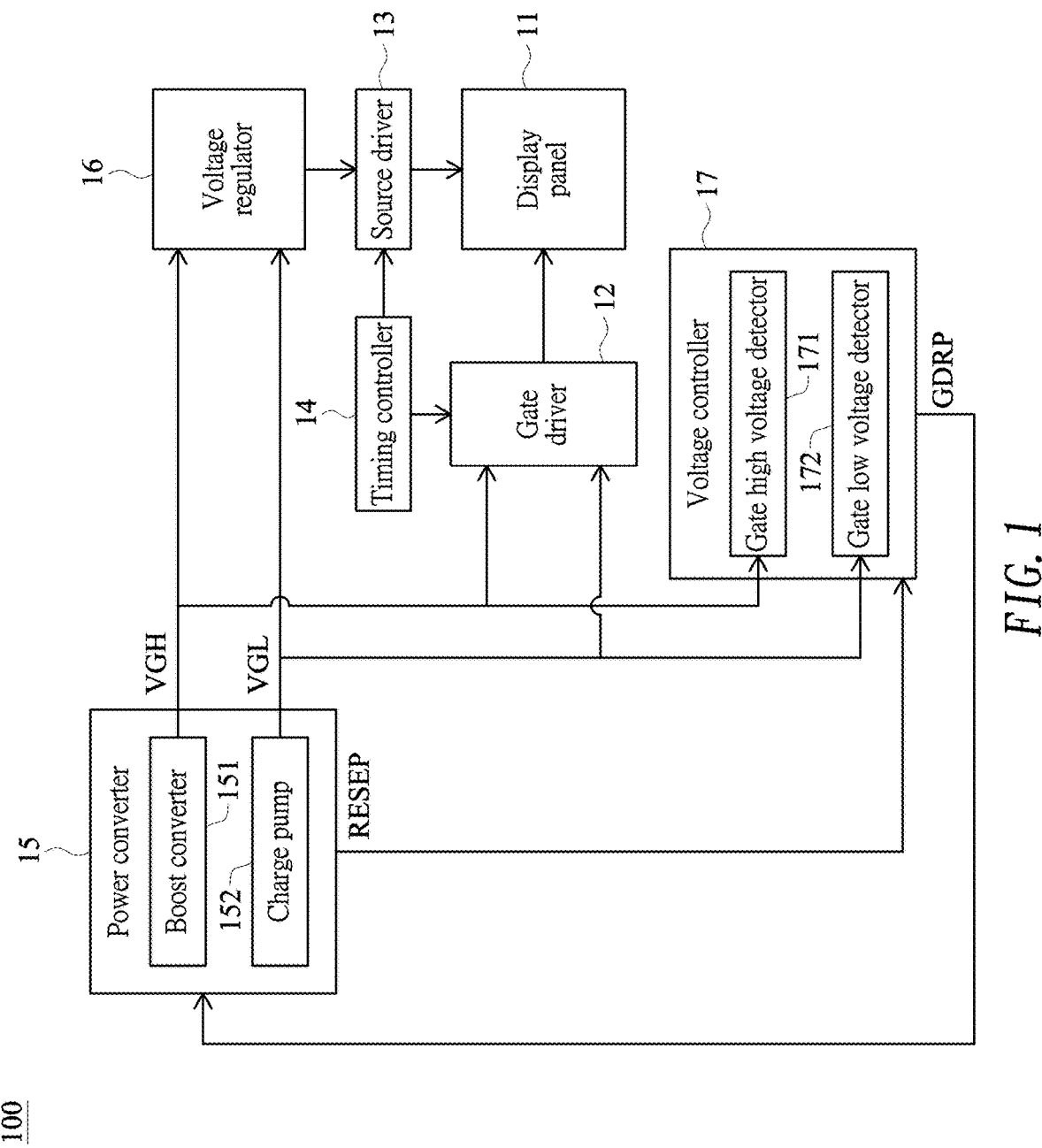
FIG. 1 shows a block diagram illustrating a display system according to one embodiment of the present invention.

FIG. 1 shows a block diagram illustrating a display system 100 adaptable to, but not limited to, electronic shelf label (ESL) according to one embodiment of the present invention.

In the embodiment, the display system 100 may include a display panel 11 (e.g., electronic paper), composed of a plurality of pixels arranged in a matrix form. The display system 100 may include a gate driver 12 configured to activate a pixel row of the display panel 11, and a source driver 13 configured to provide image data to pixel columns of the display panel 11. The display system 100 may include a timing controller 14 configured to coordinating the gate driver 12 and the source driver 13.

The display system 100 may include a power converter 15 configured to generate power voltages to the gate driver 12. In the embodiment, the power converter 15 may include a boost converter 151 configured to generate a gate high voltage VGH for the gate driver 12, and a charge pump 152 configured to generate a gate low voltage VGL for the gate driver 12, where the gate high voltage VGH (usually a positive voltage) is greater than the gate low voltage VGL (usually a negative voltage).

The display system 100 may include a voltage regulator 16, such as a low-dropout (LDO) voltage regulator, coupled to receive the power voltages generated by the power converter 15 and configured to generate a regulated voltage for the source driver 13.

The display system 100 may include a voltage controller 17 configured to detect the power voltages generated by the power converter 15 and according to generate a control signal GDRP for controlling the power converter 15, thereby maintaining the gate high voltage VGH and the gate low voltage VGL at nominal voltage values. In the embodiment, the voltage controller 17 may include a gate high voltage detector 171 configured to detect the gate high voltage VGH. According to one aspect of the embodiment, the voltage controller 17 may further include a gate low voltage detector 172 configured to detect the gate low voltage VGL.

Figure 2:
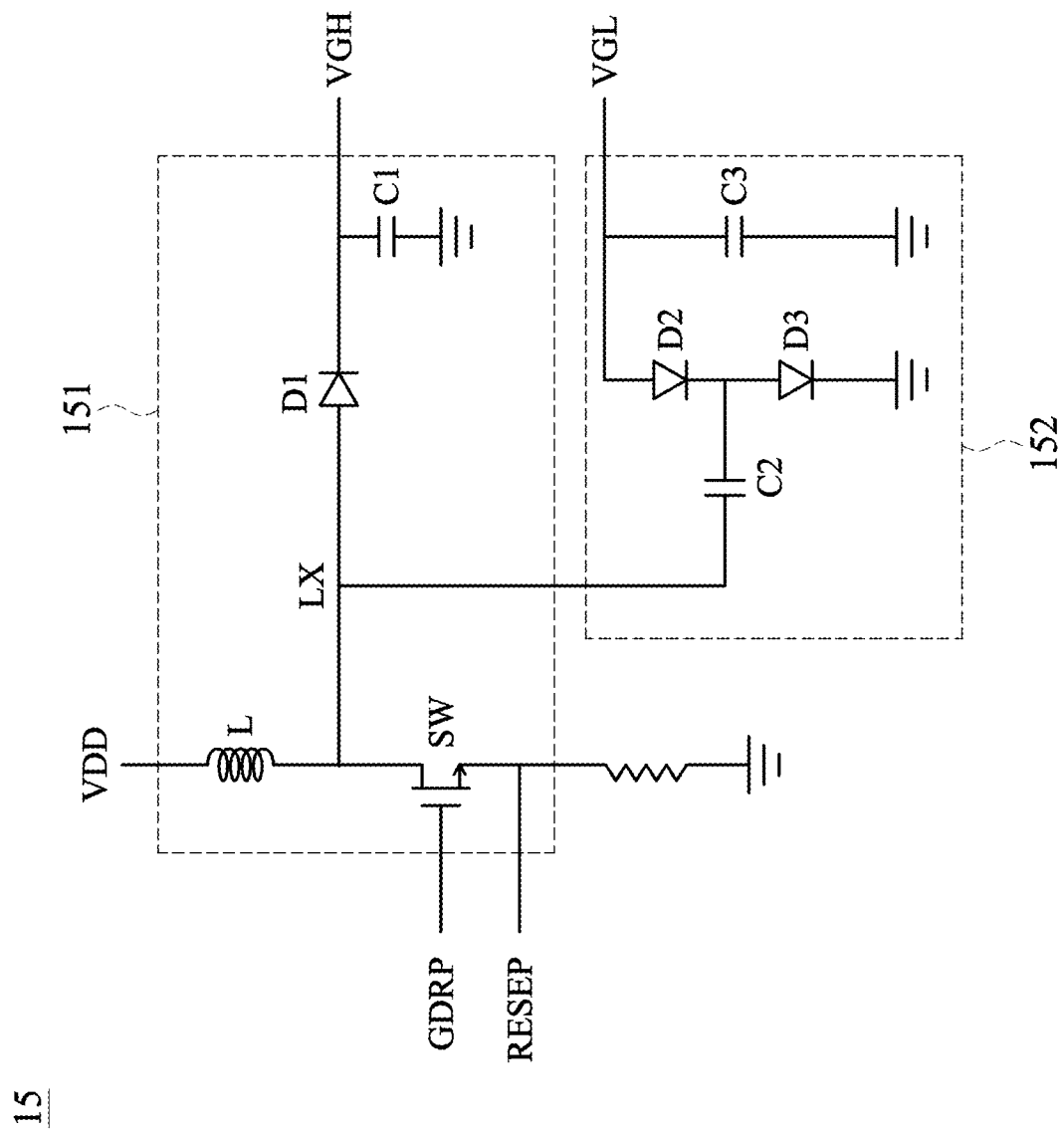
FIG. 2 shows a circuit diagram illustrating the power converter of FIG. 1.

FIG. 2 shows a circuit diagram illustrating the power converter 15 of FIG. 1. In the embodiment, the boost converter 151 may primarily include an inductor L, a switch SW, a first diode D1 and a first capacitor C1. Specifically, the inductor L and the switch SW (e.g., N-type metal-oxide-semiconductor transistor) are connected in series between a (system) power VDD and ground. The inductor L and (a first end of) the switch SW are interconnected at a first node LX, and the switch SW (e.g., a gate of the N-type metal-oxide-semiconductor transistor) is controlled by the control signal GDRP (of the voltage controller 17). The first diode D1 and the first capacitor C1 are connected in series between the first node LX and the ground, where an anode of the first diode D1 is connected to the first node LX, and one end of the first capacitor C1 is connected to the ground. The first diode D1 and (another end of) the first capacitor C1 are interconnected at a second node VGH, which provides the gate high voltage VGH.

In the embodiment, the charge pump 152 may primarily include a second diode D2, a third diode D3, a second capacitor C2 and a third capacitor C3. Specifically, the second diode D2 and the third diode D3 are forward-biased connected between a third node VGL and the ground, where the third node VGL provides the gate low voltage VGL, an anode of the second diode D2 is connected to the third node VGL, and a cathode of the third diode D3 is connected to the ground. An interconnected node between the second diode D2 and the third diode D3 is connected to the first node LX via the second capacitor C2. The third capacitor C3 is connected between the third node VGL and the ground.

In the operation of the boost converter 151, when the switch SW is turned on, a current mainly flows from the inductor L to the switch SW, thereby storing energy in the inductor L. When the switch SW is turned off, a current mainly flows from the inductor L to the first capacitor C1, thereby reducing energy of the inductor L and providing the gate high voltage VGH at the second node VGH.

In the operation of the charge pump 152, when the switch SW is turned off, a current mainly flows from the second capacitor C2 to the third diode D3, thereby storing energy in the second capacitor C2. When the switch SW is turned on, a current mainly flows from the third capacitor C3 to the second capacitor C2 via the second diode D2, thereby reducing energy of the second capacitor C2 and providing the gate low voltage VGL at the third node VGL.

Figure 3:
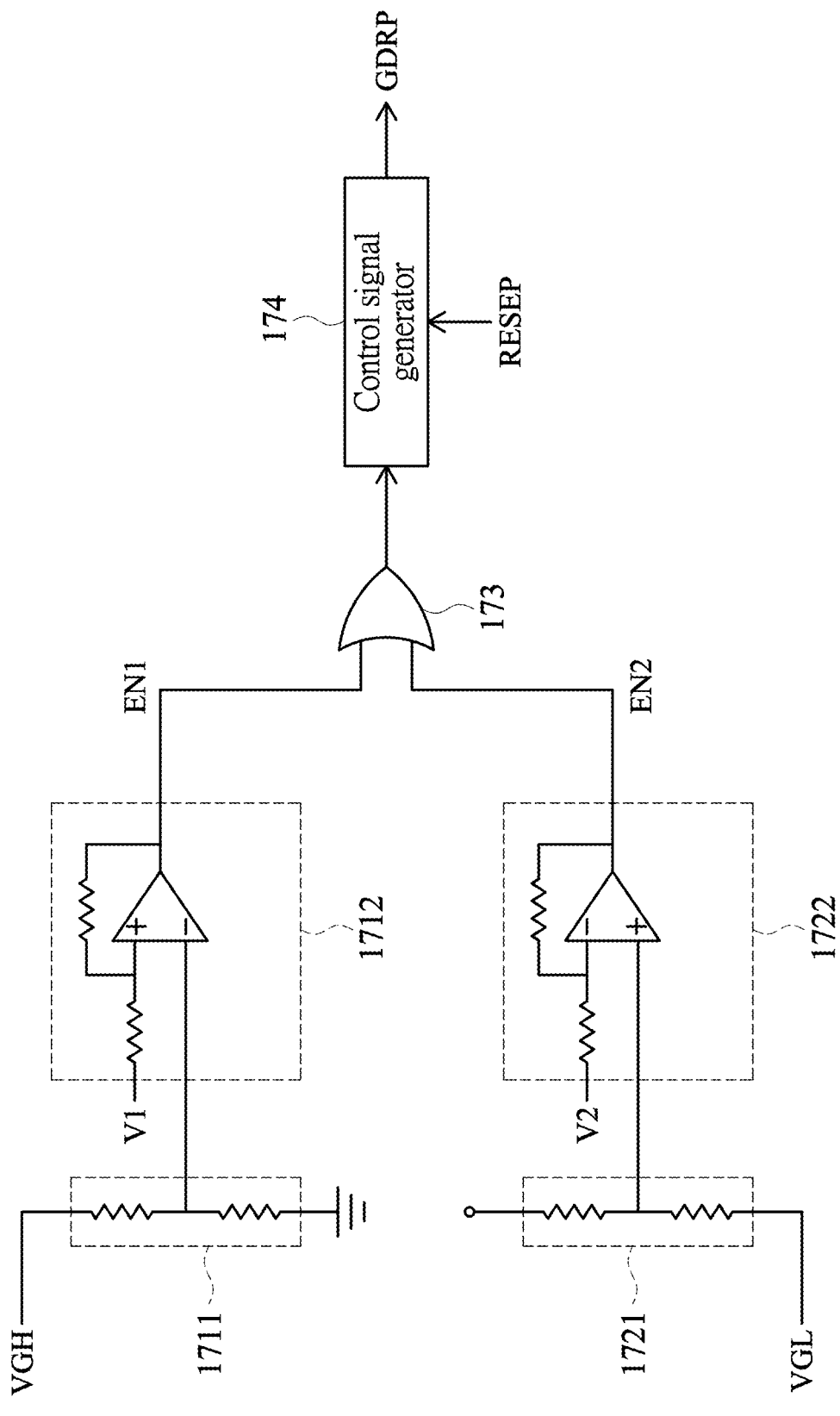
FIG. 3 shows a circuit diagram illustrating the voltage controller of FIG. 1.

FIG. 3 shows a circuit diagram illustrating the voltage controller 17 of FIG. 1. In the embodiment, the gate high voltage detector 171 may include a first voltage divider 1711 configured to obtain a first divided voltage of the gate high voltage VGH. The gate high voltage detector 171 may include a first comparator 1712 configured to compare the first divided voltage and a first reference voltage V1, thereby generating a first enable signal EN1. Accordingly, the first comparator 1712 (of the gate high voltage detector 171) generates an active first enable signal EN1 when the gate high voltage VGH is lower than a predetermined first threshold.

The gate low voltage detector 172 of the embodiment may include a second voltage divider 1721 configured to obtain a second divided voltage of the gate low voltage VGL. The gate low voltage detector 172 may include a second comparator 1722 configured to compare the second divided voltage and a second reference voltage V2, thereby generating a second enable signal EN2. Accordingly, the second comparator 1722 (of the gate low voltage detector 172) generates an active second enable signal EN2 when the gate low voltage VGL is higher than a predetermined second threshold.

The voltage controller 17 of the embodiment may include a logic circuit 173 (e.g., OR gate) configured to pass the active first enable signal EN1 or the active second enable signal EN2, thereby controlling the power converter 15 (by turning on the switch SW) and maintaining the gate high voltage VGH and the gate low voltage VGL at nominal voltage values.

The voltage controller 17 of the embodiment may include a control signal generator 174 configured to generate the control signal GDRP according to the first enable signal EN1 or the second enable signal EN2 of the logic circuit 173, and according to a detect signal RESEP of the power converter 15 (e.g., a voltage at a second end of the switch SW such as a source voltage of the N-type metal-oxide-semiconductor transistor). In one embodiment, the switch SW is turned off when the detect signal RESEP is higher than a predetermined (third) threshold.

Although specific embodiments have been illustrated and described, it will be appreciated by those skilled in the art that various modifications may be made without departing from the scope of the present invention, which is intended to be limited solely by the appended claims.

What is claimed is:

1. A voltage controller of a display system, comprising:
   a gate high voltage detector for detecting a gate high voltage; and
   a gate low voltage detector for detecting a gate low voltage;
   wherein the gate high voltage and the gate low voltage are supplied to a gate driver, and the gate high voltage is greater than the gate low voltage;
   wherein the gate high voltage detector generates an active first enable signal to compensate for insufficient gate high voltage when the gate high voltage is lower than a predetermined first threshold.

2. The voltage controller of claim 1, wherein the gate high voltage detector comprises:
   a first voltage divider for obtaining a first divided voltage of the gate high voltage; and
   a first comparator that compares the first divided voltage and a first reference voltage, thereby generating the active first enable signal when the gate high voltage is lower than the predetermined first threshold.

3. The voltage controller of claim 2, wherein the gate low voltage detector comprises:
   a second voltage divider for obtaining a second divided voltage of the gate low voltage; and
   a second comparator that compares the second divided voltage and a second reference voltage, thereby generating an active second enable signal when the gate low voltage is higher than a predetermined second threshold.

4. The voltage controller of claim 3, further comprising:
   a logic circuit that passes the active first enable signal or the active second enable signal, thereby controlling a power converter of the display system and maintaining the gate high voltage and the gate low voltage at nominal voltage values.

5. The voltage controller of claim 4, further comprising:
   a control signal generator that generates a control signal to control the power converter according to the first enable signal or the second enable signal of the logic circuit, and according to a detect signal of the power converter.

6. A display system, comprising:
   a display panel composed of a plurality of pixels arranged in a matrix form;
   a gate driver that activates a pixel row of the display panel;
   a source driver that provides image data to pixel columns of the display panel;
   a power converter that generates power voltages to the gate driver; and
   a voltage controller that detects the power voltages generated by the power converter and accordingly generates a control signal for controlling the power converter, the voltage controller comprising a gate high voltage detector for detecting a gate high voltage for the gate driver;
   wherein the gate high voltage detector generates an active first enable signal to compensate for insufficient gate high voltage when the gate high voltage is lower than a predetermined first threshold.

7. The display system of claim 6, wherein the display panel comprises electric paper.

8. The display system of claim 6, further comprising a timing controller for coordinating the gate driver and the source driver.

9. The display system of claim 6, further comprising:
a voltage regulator coupled to receive the power voltages generated by the power converter and configured to generate a regulated voltage for the source driver.

10. The display system of claim 6, wherein the power converter comprises:
a boost converter that generates the gate high voltage for the gate driver; and
a charge pump that generates a gate low voltage for the gate driver, wherein the gate high voltage is greater than the gate low voltage.

11. The display system of claim 10, wherein the boost converter comprises:
an inductor;
a switch, being connected with the inductor in series between a power and ground, the inductor and a first end of the switch being interconnected at a first node, and the switch being controlled by the control signal;
a first diode; and
a first capacitor, being connected with the first diode in series between the first node and the ground, wherein an anode of the first diode is connected to the first node, and the first diode and the first capacitor are interconnected at a second node, which provides the gate high voltage.

12. The display system of claim 11, wherein the charge pump comprises:
a second diode;
a third diode, being forward-biased connected with the second diode between a third node and the ground, wherein the third node provides the gate low voltage;
a second capacitor, via which an interconnected node between the second diode and the third diode is connected to the first node; and
a third capacitor, being connected between the third node and the ground.

13. The display system of claim 11, wherein the switch comprises an N-type metal-oxide semiconductor transistor.

14. The display system of claim 11, wherein the voltage controller comprises:
a gate low voltage detector for detecting the gate low voltage.

15. The display system of claim 14, wherein the gate high voltage detector comprises:
a first voltage divider for obtaining a first divided voltage of the gate high voltage; and
a first comparator that compares the first divided voltage and a first reference voltage, thereby generating the active first enable signal when the gate high voltage is lower than the predetermined first threshold.

16. The display system of claim 15, wherein the gate low voltage detector comprises:
a second voltage divider for obtaining a second divided voltage of the gate low voltage; and
a second comparator that compares the second divided voltage and a second reference voltage, thereby generating an active second enable signal when the gate low voltage is higher than a predetermined second threshold.

17. The display system of claim 16, wherein the voltage controller further comprises:
a logic circuit that passes the active first enable signal or the active second enable signal, thereby controlling the power converter and maintaining the gate high voltage and the gate low voltage at nominal voltage values.

18. The display system of claim 17, wherein the voltage controller further comprises:
a control signal generator that generates the control signal according to the first enable signal or the second enable signal of the logic circuit, and according to a detect signal of the power converter.

19. The display system of claim 18, wherein the detect signal is a voltage at a second end of the switch.

20. The display system of claim 19, wherein the switch is turned off when the detect signal is higher than a predetermined third threshold.

* * * * *